United States Patent [19]

Glass et al.

[11] Patent Number: 4,935,654
[45] Date of Patent: Jun. 19, 1990

[54] AXIAL MAGNET BEARING

[75] Inventors: Dieter Glass, Sandhausen; Wilfried Eixelsberger, Hirschberg; Peter Bührer, Lautertal, all of Fed. Rep. of Germany

[73] Assignee: Asea Brown Boveri Aktiengesellschaft, Mannheim, Fed. Rep. of Germany

[21] Appl. No.: 276,247

[22] Filed: Nov. 25, 1988

[30] Foreign Application Priority Data

Nov. 27, 1987 [DE] Fed. Rep. of Germany ....... 3740295

[51] Int. Cl.⁵ ............................................. F16C 39/06
[52] U.S. Cl. .................................... 310/90.5; 310/59; 310/62
[58] Field of Search ................... 310/90.5, 62, 63, 61, 310/157, 59

[56] References Cited

U.S. PATENT DOCUMENTS

| | | | |
|---|---|---|---|
| 3,588,290 | 6/1971 | Kreutzkampf | 310/61 |
| 3,623,835 | 6/1969 | Boyd | 310/90.5 |
| 4,523,896 | 6/1985 | Lhenry | 310/90.5 |
| 4,734,606 | 3/1988 | Hajec | 310/90.5 |

FOREIGN PATENT DOCUMENTS

| | | |
|---|---|---|
| 1165144 | 3/1964 | Fed. Rep. of Germany . |
| 3220851 | 12/1983 | Fed. Rep. of Germany . |
| 3302839 | 8/1984 | Fed. Rep. of Germany . |
| 3523344 | 1/1987 | Fed. Rep. of Germany . |
| 1025619 | 4/1953 | France ............. 310/90.5 |
| 0073624 | 4/1984 | Japan ............... 310/90.5 |
| 0148366 | 8/1985 | Japan ............... 310/90.5 |

Primary Examiner—R. Skudy
Attorney, Agent, or Firm—Herbert L. Lerner; Laurence A. Greenberg

[57] ABSTRACT

In an axial magnet bearing having an axial bearing disc, the axial bearing disc is constructed as a fan impeller for conveying a gaseous coolant. In this way, an effective cooling of the magnet bearing is achieved with a simple structure and, at the same time, it is possible to cool further heat-releasing elements, assemblies or units with the aid of a coolant flow promoted by the axial bearing disc.

14 Claims, 4 Drawing Sheets

AXIAL MAGNET BEARING

The invention relates to an axial magnet bearing having an axial bearing disc which cooperates with at least one electromagnet, the axial bearing disc being equipped with a central mounting hub for mounting a shaft to be supported therein, as well as with at least one peripheral axial bearing surface.

During the operation of axial magnet bearings which are provided for the contact-free acceptance of axial forces from shafts, the electromagnets thereof release heat due to losses, which must be led away. If such magnet bearings are used to support elements, assemblies or units and especially electromotors which release heat due to losses, this heat due to losses must additionally be led away. The same also applies if there are heat flows from outside into the element or the like, because of increased temperatures at the place of installation.

It is known generally from the prior art to attach separate fan impellers to the rotors of elements or the like, especially electromotors. The separate fan impellers produce a flow of cooling air over those portions of the element which require cooling. Regardless of whether it is a question of an electromotor or of a different element provided with a rotating shaft, and regardless of the location at which the separate fan impeller is disposed on the shaft, the following disadvantages are always present: Lengthening and increase in the diameter of shaft and housing, the danger of additional excitation of vibrations, limitation of the maximum permissible operational speed due to to flexural and torsional vibrations, impairment of the accessibility of parts located behind the fan impeller, increased expenditure for the separate fan impeller and for the mounting thereof on the shaft, and an increased space requirement for the fitting and removal of the shaft, which has been made longer in order to accept the fan impeller.

It is accordingly an object of the invention to provide an axial magnet bearing, which overcomes the hereinaforementioned disadvantages of the heretofore-known devices of this general type, in which the heat due to losses can be led away without great expense, and which, when used to support rotating elements, assemblies or units which release heat due to losses, especially shafts of electromotors, provides a short, compact construction in conjunction with intense cooling and reduced expenditure.

With the foregoing and other objects in view there is provided, in accordance with the invention, an axial magnet bearing assembly, comprising an axial magnet bearing having an axial bearing disc for cooperating with at least one electromagnet, the axial bearing disc having a central mounting hub for mounting a shaft to be supported therein, the axial bearing disc having at least one peripheral axial bearing surface, and the axial bearing disc having ducts formed therein essentially extending in a radial direction from the vicinity of the mounting hub to the periphery of the axial bearing disc for conveying a gaseous coolant.

With the objects of the invention in view, there is also provided an axial magnet bearing assembly, comprising an axial magnet bearing having an axial bearing disc for cooperating with at least one electromagnet, the axial bearing disc having a central mounting hub for mounting a shaft to be supported therein, and the axial bearing disc having at least one peripheral axial bearing surface, and axially conveying impeller vanes or axial vanes disposed on the axial bearing disc for a gaseous coolant.

According to the invention an axial bearing disc is used which is required in any event for the axial support of a shaft for generating a flow of coolant over the regions of the elements or the like which release heat or heat due to losses, so that no further or additional conveying devices are required for the gaseous coolant. In the case of electromotors there is no need for the fan impeller which is usually provided. Since, in this connection, the coolant flow leads over the axial bearing disc, the region of the magnet bearing is well cooled without additional expenditure.

Moreover, the selective configuration of radial ducts or impeller vanes makes it possible to adapt the magnet bearing individually to the given place of installation if the support of an element or of an assembly necessitates an axial magnet bearing, which requires peripheral axial bearing regions at both sides of the axial bearing disc. Therefore, in accordance with another feature of the invention, the axial bearing disc includes a circular base disc and a circular top disc bordering the ducts in the axial direction, and radial vanes bordering the ducts in the radial direction, the at least one axial bearing surface being in the form of an axial bearing surface disposed on the base disc and axial bearing surface disposed on the top disc. However, if it is only required to have a one-sided support with the aid of a single axial bearing region, it is advantageous to place the axial bearing region at the base disc and to eliminate the top disc. In this way, the expenditure is considerably reduced.

It is advantageous for the radial vanes, and thus the ducts, to have bends which are adapted to the desired mass flow and to the required pressure increase of the gaseous coolant. If only low pressures are required for generating a sufficient coolant flow, preference is given to radial vanes which are bent forward or are straight. Since, in most cases, high overpressures, e.g. 1.5 bar, are required to overcome the resistance to flow, it is advantageous for the radial vanes to be bent backwards. Therefore, in accordance with a further feature of the invention, the radial vanes are bent backwards, as seen in the direction of rotation. The form of the bend is related to the direction of rotation of the axial bearing disc.

In accordance with an added feature of the invention, each of the ducts are include substantially radially and axially extending straight segments, and preferably the ducts are bore holes formed in the axial bearing disc. This enables an especially simple production of an axial bearing disc having straight vanes and straight ducts.

In accordance with an additional feature of the invention, the axial vanes are straight and preferably are mounted in an even distribution about the periphery of the axial bearing disc. If the axial bearing disc is provided with axial vanes, this is advantageous because of the simplicity of production. The axial vanes are aligned radially.

In accordance with yet another feature of the invention, there is provided a drive, especially an electromotor, having an interior in which the magnet bearing is disposed, a ring channel surrounding the axial bearing disc, and guide vanes extending essentially radially in the ring channel. In this way, the conveyance of the gaseous coolant is substantially improved and the expenditure of energy required for this purpose is substantially decreased.

In accordance with yet a further feature of the invention, the guide vanes have a bend being opposite to the bend of the radial vanes. Since the radial vanes are mostly bent backwards, the guide vanes are provided with a forward bend. For straight radial vanes, the guide vanes are likewise bent forwards.

In accordance with yet an added feature of the invention, there is provided a drive, especially an electromotor, having a housing with an inner wall surface and an interior in which the magnet bearing is disposed, and support discs connected to the housing wall for holding electromagnets, the axial vanes being surrounded with little play in the radial direction by the inner wall surface of the housing, and the support discs having through openings for the gaseous coolant formed therein in front of and behind the axial vanes, as seen in coolant flow direction. In accordance with a concomitant feature of the invention, there are provided guide vanes disposed in the through openings. This is done so that high conveying powers can also be attained with an axial magnet bearing having axial vanes.

Other features which are considered as characteristic for the invention are set forth in the appended claims.

Although the invention is illustrated and described herein as embodied in an axial magnet bearing, it is nevertheless not intended to be limited to the detail shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
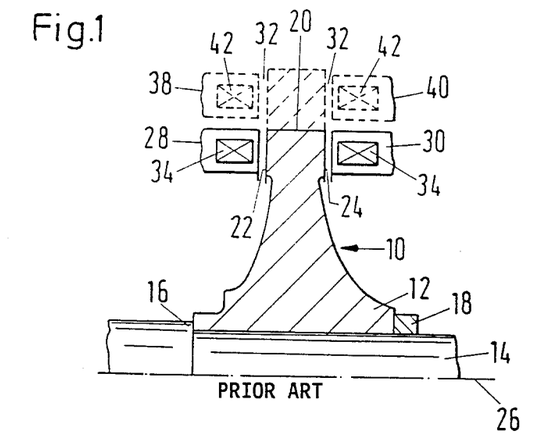
FIG. 1 is a fragmentary, diagrammatic, axial cross-sectional view of an axial magnet bearing according to the prior art, in which only the upper half of the magnet bearing is represented.

Referring now in detail to the figures of the drawings in which the same parts are provided with the same reference numerals and in which individual parts recurring in the individual figures are only provided with reference numerals to the extent that this is required for comprehension, and first, particularly, to FIG. 1 thereof, there is seen an axial magnet bearing according to the prior art in cross section. In this connection, only the upper half of the magnet bearing is represented and parts lying behind the plane of section are not illustrated. Such an axial magnet bearing is provided for the contact-free axial support of shafts, which are stressed by forces acting axially. The magnet bearing has a circular axial bearing disc 10, which is provided with a central hub 12. The axial bearing disc 10 is mounted on a shaft 14 with the aid of the hub 12. The magnet bearing is provided for the support of the shaft 14. In order to fix the magnet bearing disc 10 axially on the shaft 14, the hub 12 is disposed between a step 16 of the shaft 14 and a ring 18 mounted on the shaft 14. The radial fixing takes place by means of a non-illustrated featherkey.

The axial bearing disc 10 tapers in cross section as seen in direction from the mounting hub 12 towards an outer edge 20 thereof. In this connection, a left hand, peripheral axial bearing surface 22 is disposed at the left-hand side of the axial bearing disc 10 and a corresponding right-hand peripheral axial bearing surface 24 is disposed at the right-hand side in the drawing, in the vicinity of the outer edge 20. The two bearing surfaces 22, 24 have identical dimensions, are of circular ring shape and flat construction, and extend perpendicular to the axis 26 of the shaft 14, so that the two axial bearing surfaces 22, 24 are therefore mutually parallel.

A left-hand electromagnet 28 is assigned to the left-hand axial bearing surface 22 and in corresponding fashion, a right-hand electromagnet 30 is assigned to the right-hand bearing surface 24. An air gap 32 of circular ring shape is disposed between the electromagnets 28, 30 and the assigned axial bearing surfaces 22, 24 in each case. The electromagnets 28, 30 are constructed in such a way as to be of circular ring shape, and the flat surfaces thereof lying opposite the axial bearing surfaces 22, 24, respectively extend in planes which are perpendicular to the axis 26. Electric coils 34 of the electromagnets are illustrated in the drawing, although the electric connecting leads are not.

A further embodiment of the axial magnet bearing is illustrated in phantom in FIG. 1. According to the embodiment shown in phantom, if the magnet bearing is provided to intercept heavy axial loads, or to increase safety, the left-hand electromagnet 28 is surrounded by at least one further left-hand electromagnet 38 and the right-hand electromagnet 30 is surrounded by at least one further right-hand electromagnet 40. Accordingly, the axial bearing surfaces 22 and 24 are enlarged in the radial direction, so that the further electromagnets 38 and 40 also act on the axial bearing surfaces 22, 24. The further electromagnets 38, 40 are constructed in exactly the same way as the electromagnets 28 and 30. Consequently, they also have electric coils 42, which are indicated in FIG. 1.

During operation, electric current is led through the coils 34 and, if necessary, through the electric coils 42, so that the electromagnets are activated. In this way, magnetic forces are exerted on the axial bearing surfaces 22 and 24. The magnetic forces hold the axial bearing disc 10 in suspension, so that the magnet bearing can accept axial shaft forces, without the axial bearing surfaces 22 and 24 grazing the electromagnets 28 and 30 as well as the electromagnets 38 and 40, as the case may be, during the rotation of the axial bearing disc 10.

The electromagnets are heated up through the electric coils 34 and 42, as the case may be. This heat is transferred to the axial bearing surfaces 22 and 24 through radiation and convection, so that the bearing disc also experiences a warming. In addition, the bearing disc 10 is heated by the force fields emanating from the electromagnets, and by friction with the gaseous medium surrounding the axial bearing disc, so that cooling is desirable.

Figure 2:
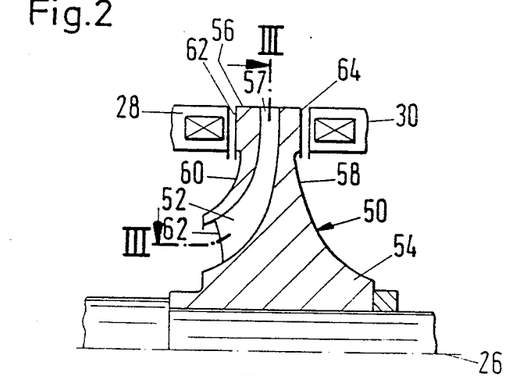
FIG. 2 is a fragmentary, axial cross-sectional view through the upper half of a magnet bearing with ducts according to the invention, which is taken along the line II—II of FIG. 3, in the direction of the arrows.

FIG. 2 shows an axial magnet bearing according to the invention in a representation corresponding to FIG. 1. By contrast with the magnet bearing according to FIG. 1, an axial bearing disc 50 is provided with a multiplicity of ducts or channels 52 extending essentially in the radial direction. These ducts are evenly distributed, they extend from the vicinity of a mounting hub 54 to an outer, cylindrical edge 56 of the axial bearing disc 50, and they discharge at that location through an outlet opening 57.

The gaseous coolant can thus flow, from the vicinity of the mounting hub 54 to the outer, cylindrical edge 56 of the axial bearing disc 50. The ducts 52 extend inside the axial bearing disc 50 and divide the disc into a base disc 58 and a top disc 60. A left-hand peripheral axial bearing surface 62 is provided at the top disc 60 and by contrast a right-hand peripheral axial bearing surface 64 is provided at the base disc 58.

Figure 3:
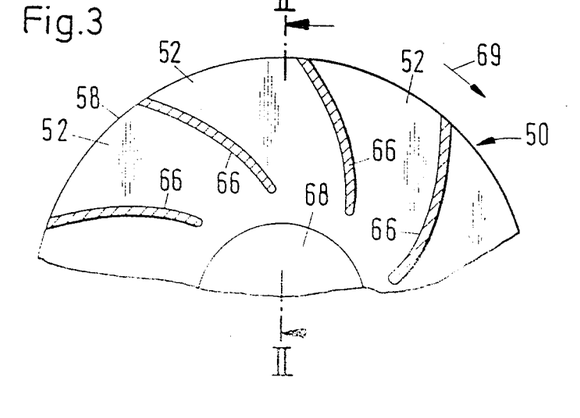
FIG. 3 is a fragmentary, sectional view of the device of FIG. 2 in accordance with a rotationally symmetrical plane of section, the profile of which is taken along the line III—III of FIG. 2, in the direction of the arrows.

The course of the ducts 52 inside the axial bearing disc 50 is clearly recognizable in the sectional representation according to FIG. 3, in which the ducts 52 are bordered in the peripheral direction by radial vanes 66, which are bent backwards in accordance with the direction of rotation of the axial bearing disc 50 indicated by an arrow 69. In the direction of the axis 26, the ducts 52 are bordered by the base disc 58 and the top disc 60, as is clearly inferred from FIG. 2. It is further seen from FIG. 2 that the ducts 52 narrow in the axial direction from the vicinity of the mounting hub 54 towards the outer edge 56. The outlet opening 57 of the ducts 52 is located at the outer edge 56 and is centered between the two axial bearing surfaces 62 and 64.

The base disc 58, the top disc 60, as well the radial vanes 66 connecting the two discs 58, 60, are advantageously produced from one piece, that is in a casting process. However, in many cases, especially with smaller bearings, it is more advantageous to produce the base disc 58, the top disc 60 and the radial vanes 66 as individual parts, and to connect them to the axial bearing disc by soldering, welding or riveting.

During operation, in the course of which the axial bearing disc 50 executes a rotational motion about the axis 26 and accepts axial forces of the shaft, the disc is held in suspension by the electromagnets 28 and 30, exactly as with the magnet bearing according to FIG. 1. At the same time, the gaseous coolant, which is preferably air, is sucked into the ducts 52 through openings 68 which are located in the vicinity of the mounting hub 54 and the coolant is conveyed to the outer edge 56 where it emerges from the ducts 52. In this way, an intensive cooling of the axial bearing disc 50 is attained, so that the disc is able to accept heat due to losses in the electromagnets 28 and 30 and in the axial bearing disc, and to transmit the heat to the coolant.

According to FIG. 2, the openings 68 of the ducts 52 are in the vicinity of the mounting hub 54 and are all disposed on the side of the axial bearing disc 50 shown at the left in the drawing. Consequently, the coolant is sucked in from the left-hand side of the axial bearing disc 50. However, if a suction is required from the right-hand side of the axial bearing disc 50, the ducts are to be routed to the right-hand side of the axial bearing disc 50. If, by contrast, the coolant is to be sucked in both from the left-hand as well as from the right-hand side of the axial bearing disc 50, it is advisable for the ducts 52 to have the openings 68 thereof alternately on the left-hand and right-hand side of the axial bearing disc. This is not represented in the figures.

Figure 4:
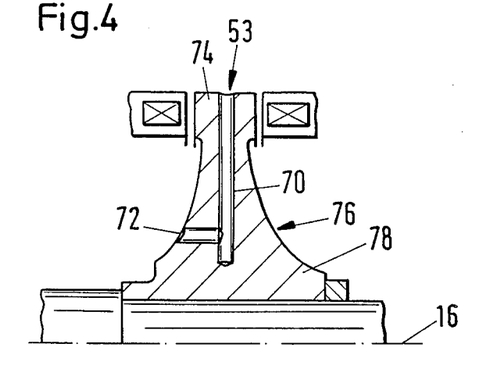
FIG. 4 is a view similar to FIG. 2 of a variation of the embodiment of FIG. 2, having ducts in the form of bore holes.

FIG. 4 shows a variation of the embodiment of FIG. 2, with reference to the ducts. The difference between the magnet bearing according to FIG. 4 and that according to FIG. 2 is that each duct 53 of FIG. 4 has a first segment 70 and a second segment 72. The first segment 70 is formed of a multiplicity of radially extending bore holes, which are disposed perpendicular to the axis 16 and are distributed evenly about the periphery. The bore holes of the first segment 70 proceed from a cylindrical outer edge 74 of an axial bearing disc 76, and terminate in the vicinity of a mounting hub 78. Bore holes are provided at the side of the axial bearing disc 76 shown at the left-hand side of the drawing, and extend in the direction of the axis 16 in the vicinity of the mounting hub 78. In each case, these bore holes form the second segment of a duct 53, so that in each case one of the these axial bore holes leads to a radially extending bore hole, which forms the first segment 70 of the duct 53. With the aid of these bore holes, it is possible to provide the axial bearing disc 76 with ducts for conveying the coolant, without great expenditure. In the embodiment under discussion, the radial ducts are straight, as are the radial vanes.

The rest of the explanations given with regard to the magnet bearing according to FIG. 2 apply to FIG. 4 as well, so that nothing further need be said here.

Figure 5:
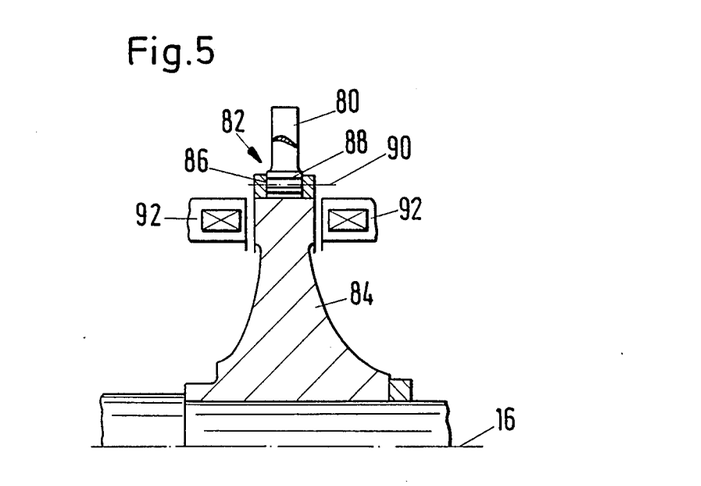
FIG. 5 is a fragmentary, cross-sectional view of the upper half of a magnet bearing according to the invention having axial vanes.

FIG. 5 shows an axial magnet bearing having axial or axially conveying impeller vanes 80, is a representation corresponding to FIGS. 1 or 2. The axial impeller vanes 80, only one of which is represented in FIG. 5, are disposed at the outer annular cylindrical edge 82 of an axial bearing disc 84, which therefore has no ducts at all. The outer edge 82 has a circumferential annular groove 86 formed therein, in which feet or bases 88 of the axial vanes are mounted by screws or rivets 90, as indicated diagrammatically. A multiplicity of the axial vanes 80, which form a row of vanes, are disposed in even distribution at the periphery of the axial bearing disc. The profile of the axial vanes is shown by hatching in FIG. 5.

During operation, the gaseous coolant, preferably air, is conveyed through the axial vanes 80 in the axial direction, i.e. in the direction of the axis 16. The coolant thereby actuates two electromagnets 92 at least on the radially outwardly disposed side, so that the heat due to losses arising in the electromagnets 92 is accepted or absorbed and led away by the coolant. The heat due to losses occurring in the axial bearing disc 84, and stemming from the electromagnets, as the case may be, is led away by heat conduction into the axial vanes, which pass on this heat due to losses to the coolant. In this way, a good cooling of the magnet bearing is attained.

Figure 6:
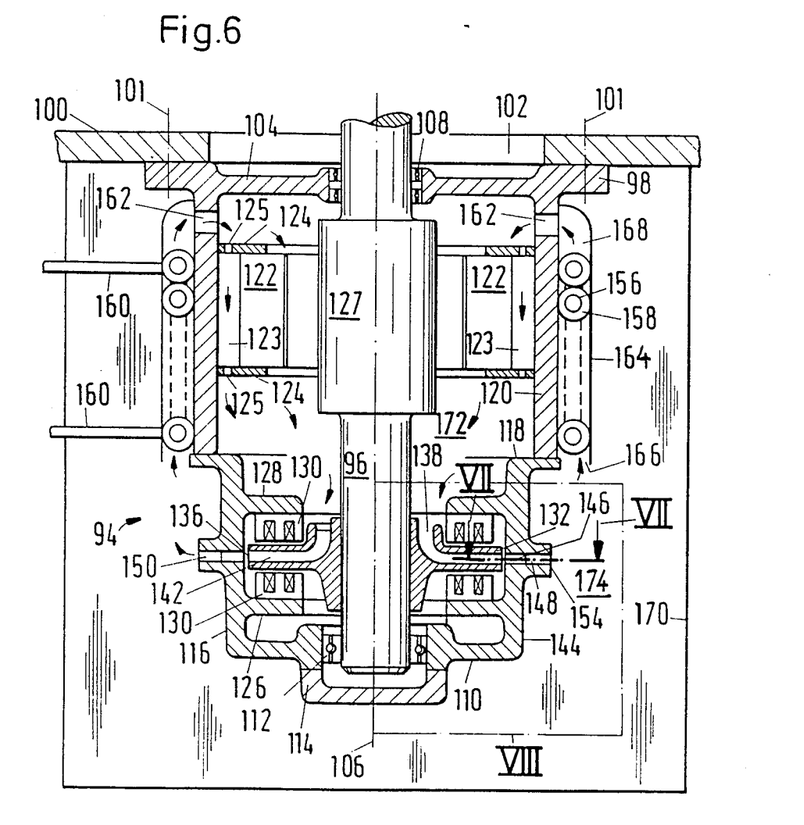
FIG. 6 is a fragmentary, sectional view showing the application of a magnet bearing according to FIG. 2 for the axial support of a drive in the form of an electromotor.

FIG. 6 is a vertical central section which shows a drive in the form of an electromotor 94 with a vertically extending motor shaft 96. In this connection, the drive is equipped with an axial magnet bearing according to FIG. 2. However, in contrast to FIG. 2, the magnet bearing of FIG. 6 has two electromagnets, each of which act on one respective axial bearing surface.

The electromotor 94 has a closed housing which is mounted on a wall 100 by means of screws 101 that are indicated diagrammatically, as well as by means of a flange 98. The wall 100 is part of a non-illustrated component, especially a blower or compressor. The motor shaft 96 is introduced into the component through an opening 102, where it supports the vanes of the blower or compressor.

A first bearing plate 104, which is disc-shaped and extends approximately at right angles to the vertical axis 106 of the motor shaft, is provided at the motor housing in the vicinity of the flange 98. Two ball bearings 108, which guide the motor shaft 96 in the radial direction, are mounted in the center of the first bearing plate 104. In this connection, a sliding fit is present between the ball bearings 108 and the bearing plate, so that the motor shaft can move unhindered in the axial direction (the direction of the vertical axis 106). In order to seal the interior 172 of the electromotor, non-illustrated seals are disposed in the vicinity of the ball bearings 108.

A disc-shaped second bearing plate 110, which likewise extends approximately at right angles to the vertical axis 106, is disposed at an end of the electromotor 94 which is the lower end in the drawing, and lies opposite the first bearing plate. The end of the motor shaft 96 shown as the lower end in the drawing is supported in the center of the second bearing plate 110 with the aid of a ball bearing 112 which is mounted at that location in the radial direction. In this case as well, it is possible to move slightly in the axial direction, through suitable construction of the bearing seat for the motor shaft. The vicinity of the ball bearing 112 is closed to the outside by an outer bearing top 114.

The second bearing plate 110 is disposed at an approximately annular cylindrical bearing housing 116, which is a component of the electromotor housing. To this end, the bearing housing is mounted to an annular cylindrical housing part 120 of the electromotor by means of an annular flange 118 and diagrammatically illustrated screws. A stator core assembly 122 of the electromotor is mounted in the housing part 120 together with a non-illustrated electric winding, with the aid of two discs 124 of circular ring shape. The discs 124 are fixed in the housing part 120 at right angles to the vertical axis 106 and hold and enclose the stator core assembly. Formed between the stator core assembly 122 and the housing part 120 is an annular chamber 123, which is connected to the interior 172 of the electromotor through a multiplicity of openings 125, that are disposed in the discs 124. A rotor 127 of the electromotor is disposed inside the stator core assembly 122 on the motor shaft 96.

A first support disc 126 which has a circular ring shape, which extends approximately at right angles to the vertical axis 106 and which surrounds the motor shaft 96 with sufficient clearance, is disposed in the bearing housing 116 at a distance from the second bearing plate 110. A second support disc 128, which is constructed and disposed in exactly the same way as the first support disc 126, is provided in the bearing housing 116 with axial clearance from the first support disc 126. Electromagnets 130 of the axial magnet bearing are each mounted at flat surfaces of the support discs 126, 128 which face one another and are at right angles to te vertical axis 106. Each of the electromagnets include two electric coils. An axial bearing disc 132 of the magnet bearing is engaged in a circular ring shaped interstice between the electromagnets 130, with sufficient axial play between the axial bearing disc and the electromagnets for a contact-free axial support. The axial bearing disc 132 is mounted on the motor shaft 96 and is constructed in the manner described in connection with FIG. 2. The electrical connecting leads of the electromagnets are not illustrated in FIG. 6.

Figure 7:
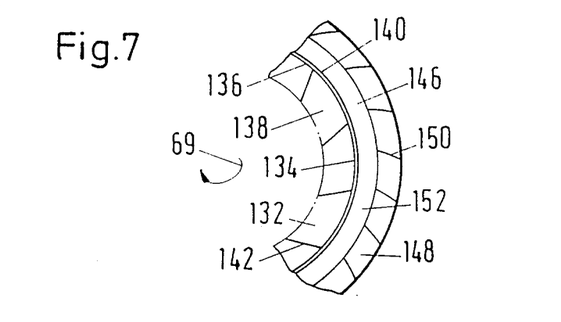
FIG. 7 is a fragmentary, cross-sectional view taken along the line VII—VII of FIG. 6, in the direction of the arrows.

FIG. 7, which shows a section taken along the section line VII—VII through FIG. 6, clearly shows that a cylindrical outer edge 134 of the axial bearing disc 132, which contains outlet openings 136 of radial ducts 138, has little play within an annular inner wall surface 140 of the bearing housing 116. Backwardly bent radial vanes 142 are also very clearly seen.

A ring opening or channel 146 having a circular ring shape, is provided in an annular cylindrical wall 144 of the bearing housing 116, opposite the outlet openings 136 of the ducts 138. The axial and preferably constant clear width of the ring opening 146 is at least as large as the axial clear width of the outlet openings 136. In this connection, the position of the ring opening 146 is chosen in such a way that the outlet openings 136 and the ring opening 146 are aligned during operation, and the coolant emerging from the ducts 138 can easily pass over into the ring opening 146. The ring opening 146 pierces the cylindrical wall 144 and discharges into a chamber 174.

A multiplicity of forwardly-bent, rigid guide vanes 150, which bridge the ring opening 146 in the axial direction and maintain the cohesion of the bearing housing 116 as shown in FIG. 7, are disposed in even distribution about the radially outer region 148 of the ring opening 146. By contrast, no guide vanes are disposed in the radially inner region 152 of the ring opening. The radial lengths of the regions 148 and 152 are approximately the same. In order to give the ring opening 146 sufficient length in the radial direction, the outside of the bearing housing 116 is provided with an annular bulge 154, into which the ring opening 146 extends.

A winding or coil of cooling tubes 156 with outer radial fins 158 is disposed around and attached to the outside of the housing part 120. Only a few of the cooling tube windings are indicated in FIG. 6. The ends of the cooling tubes are provided with connecting leads 160.

A multiplicity of radial openings 164, preferably bore holes, are distributed evenly about the periphery of the annular cylindrical housing part 120, between the end of the cooling tube winding and the flange 98. The openings 162 lead from outside into the interior 172 of the electromotor 94. The cooling tube winding is surrounded by an annular cylindrical jacket 164, which tightly abuts the fins 158. The end of the Jacket 164 adjoining the bearing housing 116 is open, and forms an annular inlet opening 166 for the coolant. The opposite end of the Jacket 164 is connected tightly to the housing part 120 in such a way that the openings 162 are located inside the jacket 164, and discharge into an annular chamber 168 formed between the jacket 164 and the housing part 120.

In the illustrated embodiment presently under discussion, the electromotor 94 is not in contact with the ambient air, but instead it is disposed in an air-tight cavity, or is surrounded with clearance by an air-tight housing. This is indicated diagrammatically in FIG. 6 by a housing 170. It is further evident that the connecting leads 160 are led through the housing 170 to the outside.

During operation of the electromotor 94, the ball bearings 108 and 112 assume the radial guidance of the vertical motor shaft 96 while, by contrast, the axial bearing disc 132 provides the contact-free axial support of the motor shaft in cooperation with the electromagnets 130, through which electric current is passed. The axial bearing thereby accepts axial forces, which act on the motor shaft 96 in the direction of the vertical axis 106. These forces are composed of the dead weight of the rotating parts and of the axial forces which are caused by the machine which is coupled to the motor shaft 96. At the same time, with the aid of the ducts 138 provided therein, the axial bearing disc 132 sucks in gaseous coolant, preferably air, nitrogen or helium, from the interior 172 of the electromotor, and conveys it through the ring opening 146 into the space or chamber 174 between electromotor 94 and housing 170. From there, the coolant flows through the annular chamber 168 between the jacket 164 and the housing part 120 to the openings 162, and emerges into the interior 172 of the electromotor. During the flow in the annular chamber 168, the gaseous coolant comes in contact with the cooling tubes 156 and the fins 158 thereof, and releases heat to the cooling water or refrigerant flowing through the cooling tubes, so that the coolant is cooled. In this connection, the intake and outlet of the cooling water or refrigerant through the connecting leads 160 takes place in such a way that the heat exchange takes place in counter-current.

While flowing from the openings 162 to the axial bearing disc 132 as indicated by arrows, the gaseous coolant absorbs the heat due to losses of the electromotor. During the flow thereof through the ducts 138 of the axial bearing disc there is additionally a further absorption of the heat due to losses of the magnet bearing. This heat due to losses is then released to the cooling water or refrigerant with the aid of the cooling tubes 156, and then led away from the system. It is quite clear from the foregoing without requiring any further explanation, that through the use of the magnet bearing according to the invention, the cooling problem is solved in a simple fashion, and that additional conveying devices are not required for the coolant. In particular, a separate fan impeller, which is normally a component of an electromotor, is not required.

If the electromotor 94 is directly exposed to the ambient air, i.e. if the housing 170 is not present, then the cooling tubes 156 and the jacket 164 are advantageously omitted. The heated coolant, which in the present case is air, flows from the ring opening 146 into the surroundings, while air from the surroundings simultaneously enters the interior 172 through the openings 162 and absorbs the heat due to losses of electromotor and the magnet bearing and leads it away to the surroundings.

Figure 8:
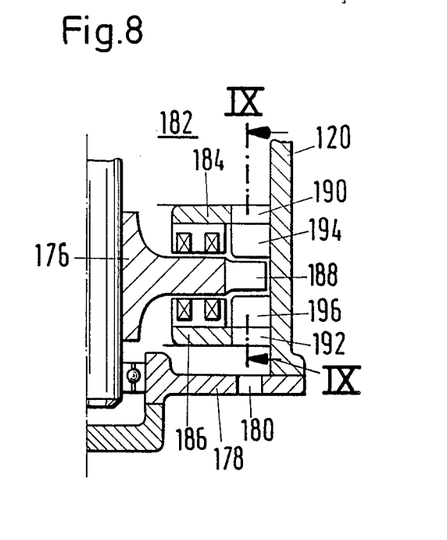
FIG. 8 is a fragmentary, sectional view showing a variation of the embodiment of the region VIII of FIG. 6, having axial vanes.

A variation of the region VIII of FIG. 6 is shown as another embodiment in FIG. 8. In FIG. 8, an axial bearing disc 176 is constructed in the manner described in detail in connection with FIG. 5. Accordingly, the axial bearing disc has a row of axial vanes 188, which terminate with little play in front of the cylindrical inner wall of the housing 120. The inner wall of the housing 120 of FIG. 8 extends with a constant diameter as far as a second radially extending bearing plate 178 which is mounted on the housing part 120. A multiplicity of openings 180 are furthermore evenly distributed about the periphery of the second bearing plate 178, in order to permit the gaseous coolant to emerge from the interior 182 of the electromotor. The play between the axial vanes 188 and the cylindrical inner wall of the housing 120 amounts to from 1 to 8 mm.

In the drawing, an upper support disc 184 together with a lower support disc 186, each of which support the electromagnets of the axial magnet bearing, are respectively provided in the vicinity of the axial vanes 188 with a multiplicity of through-openings 190, 192, which are distributed evenly about the periphery. During operation of the motor, the coolant flows through the through-openings 190 from the interior 182 of the electromotor to the axial vanes 188, and is conveyed to the outside by the vanes through the through-openings 192 disposed in the lower support disc and through an opening 180. In order to attain a flow of the gaseous coolant with as little loss as possible, the through-openings 190 and 192 are provided with respective guide vanes 194 and 196, which extend in the axial direction as far as the vicinity of the axial vanes 188. In each case, the guide vanes are combined to form a row of guide vanes. In the embodiment illustrated in FIG. 8, the absorption and release of the heat of the gaseous coolant takes place exactly as was described in connection with the embodiment illustrated in FIG. 6. Moreover, in the FIG. 8 embodiment as well, the explanations given in connection with the embodiment according to FIG. 6 apply.

Figure 9:
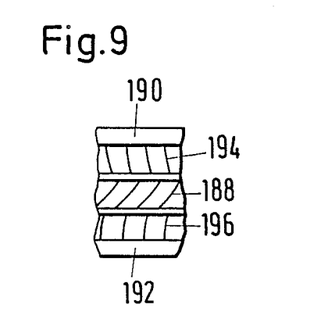
FIG. 9 is a fragmentary, sectional view in accordance with a plane of section taken along the line IX—IX of FIG. 8, in the direction of the arrows, with parts lying behind the plane of section not being represented.

The section according to FIG. 9 shows the fixed guide vanes 194 and 196, between which the rotating axial vanes 188 are disposed. In each case, a multiplicity of axial vanes 188 and guide vanes 194 and 196 are disposed evenly about the periphery. In this connection, the profile of the vanes is only diagrammatically illustrated.

The following guide values can be adopted for dimensioning the axial bearing discs in the above mentioned examples.

The axial thickness of the axial bearing disc in the region of the axial bearing surfaces 62, 64 amounts to approximately 0.5 to 1 times the diameter of the shaft on which the axial bearing disc is mounted. In the region of the outer edge of the axial bearing disc, the axial clear width of the radial ducts amounts to approximately 0.2 to 0.7 times the thickness of the axial bearing disc at that location.

The number of the radial vanes lies approximately between 8 and 30 and a similar statement also holds for the guide vanes. The maximum thickness of the impeller vanes and guide vanes amounts to approximately 0.2 to 0.4 times the thickness of the axial bearing disc in the region of the axial bearing surfaces.

The radial length of the axial vanes amounts to approximately 0.1 to 0.3 times the diameter of the axial bearing disc. The number of the axial vanes is chosen in such a way that an adequate conveyance of the coolant is attained and the number of the guide vanes is adapted to the number of the axial vanes.

The teachings of the present invention are summarized as follows:

In an axial magnet bearing having an axial bearing disc, the axial bearing disc is constructed as a fan impeller for the conveyance of a gaseous coolant. In this way, an effective cooling of the magnet bearing is attained with simple means and, at the same time, it is possible to cool further heat-releasing elements, assemblies or units with the aid of a coolant flow, which is promoted by the axial bearing disc. Consequently, further conveying devices for the gaseous coolant are not required.

The electrical connecting leads for the electromagnets and the electric winding of the electromotor are not represented in the figures. Electric current is fed-in during operation through these electrical connecting leads.

We claim:

1. Axial magnet bearing assembly, comprising an axial magnet bearing having an axial bearing disc for cooperating with at least one electromagnet, said axial bearing disc having a central mounting hub for mounting a shaft to be supported therein, said axial bearing disc having at least one peripheral axial bearing surface, and said axial bearing disc having ducts formed therein essentially extending in a radial direction from the vicinity of said mounting hub to the periphery of said axial bearing disc for conveying a gaseous coolant.

2. Axial magnet bearing assembly according to claim 1, wherein said axial bearing disc includes a circular base disc and a circular top disc bordering said ducts in the axial direction, and radial vanes bordering said ducts in the radial direction, said at least one peripheral axial bearing surface being in the form of an axial, bearing surface disposed on said base disc and axial bearing surface disposed on said top disc.

3. Axial magnet bearing assembly according to claim 2, wherein said radial vanes are bent backwards, as seen in the direction of rotation.

4. Axial magnet bearing assembly according to claim 1, wherein each of said ducts are include substantially radially and axially extending straight segments.

5. Axial magnet bearing assembly according to claim 4, wherein said ducts are bore holes formed in said axial bearing disc.

6. Axial magnet bearing assembly according to claim 1, including a drive having an interior in which said magnet bearing is disposed, a ring channel surrounding said axial bearing disc, and guide vanes extending essentially radially in said ring channel.

7. Axial magnet bearing assembly according to claim 6, wherein said drive is an electromotor.

8. Axial magnet bearing assembly according to claim 3, including a drive having an interior in which said axial magnet bearing is disposed, a ring channel surrounding said axial bearing disc, and guide vanes extending essentially radially in said ring channel, said guide vanes having a bend being opposite to said bend of said radial vanes.

9. Axial magnet bearing assembly, comprising an axial magnet bearing having an axial bearing disc for cooperating with at least one electromagnet, said axial bearing disc having a central mounting hub for mounting a shaft to be supported therein, and said axial bearing disc having at least one peripheral axial bearing surface, and axially conveying impeller vanes disposed on said axial bearing surface of said disc for a gaseous coolant.

10. Axial magnet bearing assembly according to claim 9, wherein said impeller vanes are straight.

11. Axial magnet bearing assembly according to claim 10, wherein said impeller vanes are mounted in an even distribution about the periphery of said axial bearing disc.

12. Axial magnet bearing assembly according to claim 2, including a drive having a housing with an inner wall surface and an interior in which said axial magnet bearing is disposed, and support discs connected to said housing wall for holding electromagnets, said impeller vanes being surrounded with little play in the radial direction by said inner wall surface of said housing, and said support discs having through openings for the gaseous coolant formed therein in front of and behind said impeller vanes, as seen in coolant flow direction.

13. Axial magnet bearing assembly according to claim 12, wherein said drive is an electromotor.

14. Axial magnet bearing assembly according to claim 12, including guide vanes disposed in said through openings.

* * * * *